（12） United States Patent
Yi et al.

US011084890B2

(10) Patent No.: US 11,084,890 B2
(45) Date of Patent: Aug. 10, 2021

(54) MAGNESIUM ALKOXIDE CATALYST SUPPORT AND THE PREPARATION METHOD AND USE THEREOF

(71) Applicant: PetroChina Company Limited, Beijing (CN)

(72) Inventors: Jianjun Yi, Beijing (CN); Kefeng Wang, Beijing (CN); Jie Hu, Beijing (CN); Xingfeng Chen, Beijing (CN); Yuan Yuan, Beijing (CN); Weisong Cui, Beijing (CN); Liang Cui, Beijing (CN); Zhifei Li, Beijing (CN); Rongbo Li, Beijing (CN)

(73) Assignee: PetroChina Company Ltd.

( * ) Notice: Subject to any disclaimer, the term of this patent is extended or adjusted under 35 U.S.C. 154(b) by 196 days.

(21) Appl. No.: 16/201,973

(22) Filed: Nov. 27, 2018

(65) Prior Publication Data

US 2019/0169324 A1    Jun. 6, 2019

(30) Foreign Application Priority Data

Dec. 1, 2017   (CN) .......................... 201711245608.0

(51) Int. Cl.
*C08F 10/00* (2006.01)
*C08F 4/02* (2006.01)
*C08F 110/00* (2006.01)

(52) U.S. Cl.
CPC ............... *C08F 10/00* (2013.01); *C08F 4/02* (2013.01); *C08F 2410/01* (2013.01)

(58) Field of Classification Search
CPC ........... C08F 10/02; C08F 110/02; C08F 4/02
See application file for complete search history.

(56) References Cited

U.S. PATENT DOCUMENTS

| 4,728,704 | A | 3/1988 | Chadwick et al. |
| 5,275,991 | A | 1/1994 | Buehler et al. |
| 5,869,464 | A | 2/1999 | Nomura et al. |
| 2009/0186755 | A1 | 7/2009 | Tanase et al. |
| 2009/0233793 | A1 | 9/2009 | Park et al. |

FOREIGN PATENT DOCUMENTS

| CN | 1420130 | A | 5/2003 |
| CN | 101014558 | A | 8/2007 |
| CN | 101027327 | A | 8/2007 |
| CN | 101906017 | A | 12/2010 |
| CN | 102020534 | A | 4/2011 |
| CN | 102453127 | A | 5/2012 |
| CN | 103665208 | A | 3/2014 |
| CN | 104356257 | A | 2/2015 |
| CN | 105713116 | A | 6/2016 |
| CN | 105777951 | A | 7/2016 |
| CN | 106608941 | A | 5/2017 |
| CN | 106632752 | A | 5/2017 |
| CN | 106832069 | A | 6/2017 |
| EP | 2610272 | B1 | 5/2017 |
| EP | 3438083 | A1 | 2/2019 |
| JP | 62051633 | | 3/1987 |
| JP | 3074341 | B2 | 6/2000 |
| JP | 2004-210683 | A | 7/2004 |
| JP | 2004-269467 | A | 9/2004 |
| JP | 2004-269809 | A | 9/2004 |
| JP | 2006306949 | A | 11/2006 |
| JP | 6087773 | B2 | 2/2017 |
| JP | 6304815 | B2 | 3/2018 |
| WO | WO2009130707 | A2 | 10/2009 |
| WO | WO2017/170077 | A1 | 10/2017 |
| WO | WO2018/026330 | A1 | 2/2018 |

OTHER PUBLICATIONS

First Office Action issued for corresponding Japanese Patent Application 2018-198197 dated Oct. 15, 2019.
Search report dated Nov. 6, 2019 for counterpart German patent application No. 10 2018 130 009.3.
China Patent Information Center search report dated Oct. 30, 2017 for CN Application 201711245608.0.
Research development of dialkoxy magnesium used for support of olefin polymerization catalyst, New Chemical Materials, vol. 38, No. 9, pp. 45-49.
First Office Action and search report dated Nov. 28, 2019 for counterpart Chinese patent application No. 201711245608.0, along with EN translation.
Powder Engineering vol. 1, Dec. 31, 2011, Han Yue-xin, Central South University Press.

*Primary Examiner* — Catherine S Branch
(74) *Attorney, Agent, or Firm* — Weaver Austin Villeneuve & Sampson LLP

(57) ABSTRACT

A magnesium alkoxide catalyst support and the preparation method and use thereof are provided. The method for preparing the magnesium alkoxide catalyst support comprises the following steps: mixing a metallic magnesium, a monohydric alcohol, a halogenating agent and a surfactant at 0° C. to 90° C. under an inert gas atmosphere, and then washing the resultant with an inert solvent to obtain the magnesium alkoxide catalyst support. A magnesium alkoxide catalyst support obtained by the above method is also provided, which can be used to catalyze olefin polymerization. The magnesium alkoxide catalyst support obtained by the above method according to the invention has excellent particle morphology and controllable size, and is suitable for preparing a catalyst for olefin polymerization.

10 Claims, No Drawings

MAGNESIUM ALKOXIDE CATALYST SUPPORT AND THE PREPARATION METHOD AND USE THEREOF

CROSS-REFERENCE TO RELATED APPLICATION

This application claims priority to Chinese Patent Application No. 201711245608.0, filed on Dec. 1, 2017, which is hereby incorporated by reference in its entirety.

TECHNICAL FIELD

The invention relates to a catalyst support and its preparation method, in particular to an magnesium alkoxide catalyst support and its preparation method, which pertains to the technical field of catalysts and its preparation.

BACKGROUND

Currently, one of the most widely used catalysts for olefin polymerization is the Ziegler-Natta catalyst supported by magnesium chloride. The magnesium-chloride supported Ziegler-Natta catalyst is typically a solid catalyst composition consisting of magnesium, titanium, halogen and electron donating organic compounds. When used in polymerizing an α-olefin such as propylene, it can be mixed with an organoaluminum compound as a cocatalyst and an organosilane compound as a stereoregularity regulator in an appropriate ratio for use. Since the supported catalysts for olefin polymerization are used in various commercial polymerization processes such as slurry polymerization, bulk polymerization or gas phase polymerization, it is necessary for them to meet various requirements regarding particle morphology, such as suitable particle size and shape, uniform particle size distribution, minimal larger particles or particulates and high bulk density, and essential properties required such as high catalyst activity and stereoregularity. However, there is no catalyst that can meet the above various needs at the same time.

Supported catalysts having magnesium alkoxide as a support can have more excellent properties. For example, as described in Chinese Patent Application Nos. 200580028649.3, 200580032074.2, and 01137496.9, magnesium alkoxide is used as a support to enhance various properties of the catalyst. Therefore, it is necessary to develop techniques for manufacturing magnesium alkoxide with excellent performance.

The methods for preparing spherical magnesium dialkoxides as disclosed includes mainly the follows methods: (1). reacting firstly an alcohol and metallic magnesium to form magnesium dialkoxide, and then mechanically pulverizing the resultant to adjust the particle size thereof; (2). a producing method by reacting metallic magnesium and ethanol such that the final ratio of magnesium to ethanol is controlled within a range of 1/9 to 1/15, and further refluxing ethanol such that ethanol and magnesium are intermittently or continuously reacted (JP3074341); (3). a producing method by spray-drying an alcohol solution of carboxylated magnesium carboxylate, followed by decarboxylation to obtain fine round particles (JP6087773); (4). a producing method by reacting metallic magnesium with ethanol under a condition of saturated hydrocarbon (JP6304815); (5). a producing method by dispersing $Mg(OR)_2$ in R'OH and spray-drying the resultant to obtain solid particles suspended in ROH, and then removing R'OH by distillation to obtain round particles (JP62051633).

However, the above prior-art methods have various defects. For example, in method (1), the mechanical pulverization may destroy the original shape of the particles. In method (2), it is regulated that the ratio of magnesium to ethanol is controlled within the range of 1/9 to 1/15. However, it has been found by investigation that, the viscosity of the reaction system will rise sharply in the latter half of the reaction if the addition ratio is fixed at 1/9, and the particles will agglomerate without sufficient agitation when the reaction rate exceeds 80%, so that no uniform round particle is obtained in the experiment, while the shape of the particles will be destroyed if it is forcibly stirred (JP8073388). Alternatively, if the initial addition ratio is fixed at 1/15, the reaction occurs with a larger amount of ethanol, thus stirring can be carried out smoothly when the viscosity increases in the final stage of the reaction, but the obtained particles have a shape which is insufficiently round and a much lower bulk density, and thus do not satisfy the above conditions. The methods (3) to (5) have complicated operations and include other raw materials in addition to Mg and ROH, thus cannot satisfy the requirements.

SUMMARY

The present invention is made in view of the above technical problems. An object of the present invention is to provide a method for preparing a magnesium alkoxide catalyst support having a controlled particle size and good morphology.

To achieve the above technical object, the present invention provides a method for preparing a magnesium alkoxide catalyst support, comprising the following steps:

mixing a metallic magnesium, a monohydric alcohol, a halogenating agent and a surfactant at 0° C. to 90° C. under an inert gas atmosphere, and then washing the resultant with an inert solvent to obtain the magnesium alkoxide catalyst support;

wherein the monohydric alcohol is added in an amount of 2 mol to 50 mol, the halogenating agent is added in an amount of 0.0025 mol to 0.03 mol, and the inert organic solvent is added in an amount of 2 mol to 50 mol, based on 1 mol of the metallic magnesium;

wherein the surfactant is added in a volume of from 0.01% to 10% based on the volume of the monohydric alcohol, and the surfactant used is one or more selected from aliphatic esters or aromatic esters having 1 to 20 carbon atoms.

In the method for preparing the magnesium alkoxide catalyst support provided by the present invention, preferably, the surfactant used is one or more selected from n-butyl titanate, tributyl phosphate, triphenyl phosphate, triethyl phosphite, 1,2-butanediol ditosylate, catechol di-p-tosylate, diethyl phthalate, di-n-butyl phthalate, diisobutyl phthalate, ethylene glycol diacetate and triacetin.

In the method for preparing the magnesium alkoxide catalyst support provided by the present invention, preferably, the metallic magnesium, the monohydric alcohol and the halogenating agent used are added at one time or in multiple times; more preferably, they are added in multiple times.

In the method for preparing the magnesium alkoxide catalyst support provided by the present invention, the metallic magnesium is not particularly limited in its shape. In the case of having good reaction performance, metallic magnesium of any shape, such as granules, strips or powders, can be used.

In the method for preparing the magnesium alkoxide catalyst support provided by the present invention, preferably, the metallic magnesium used has a particle size of 0.5 µm to 300 µm.

In the method for preparing the magnesium alkoxide catalyst support provided by the present invention, the monohydric alcohol used is not particularly limited, and preferably, the monohydric alcohol used includes one or more selected from aliphatic alcohols or aromatic alcohols having 1 to 10 carbon atoms. More preferably, the monohydric alcohol used includes one or more selected from methanol, ethanol, n-propanol, isopropanol, n-butanol, isobutanol, n-pentanol, isopentanol, n-hexanol, isohexanol, n-heptanol, isoheptanol, n-octanol, isooctanol, n-nonanol, isononanol, n-decanol, isodecanol, phenol, phenyl methanol, phenyl ethanol and phenyl propanol. Most preferably, the monohydric alcohol used includes one or more selected from methanol, ethanol, propanol and butanol.

In the method for preparing the magnesium alkoxide catalyst support provided by the present invention, the halogenating agent used is not particularly limited, and preferably, the halogenating agent used includes one or more selected from iodine, bromine, chlorine, magnesium iodide, magnesium bromide, magnesium chloride, calcium iodide, calcium bromide, calcium chloride, mercuric iodide, mercuric bromide, mercuric chloride, carbon tetraiodide, carbon tetrabromide, carbon tetrachloride and alkoxy magnesium halide. More preferably, the halogenating agent used includes one or more selected from iodine, carbon tetrachloride, magnesium iodide, magnesium chloride and alkoxy magnesium halide.

According to a particular embodiment of the invention, the iodine used may be applied into the reaction in pure form or in solution, preferably in the form of a solution of iodine in an anhydrous ethanol.

In the method for preparing the magnesium alkoxide catalyst support provided by the present invention, the mixed product may be washed with an alcohol used for preparing the magnesium alkoxide, may be washed with an organic solvent used in the reaction, or may be washed with other inert organic solvent. There is no particular limitation to the washing treatment procedure and frequency.

In the method for preparing the magnesium alkoxide catalyst support provided by the present invention, preferably, the inert organic solvent used includes one or more selected from hexane, heptane, octane, decane, benzene, toluene, xylene, chlorobenzene, a toluene derivative, a xylene derivative and a chlorobenzene derivative.

In the method for preparing the magnesium alkoxide catalyst support provided by the present invention, preferably, the monohydric alcohol is added in an amount of 5 mol to 20 mol, and the halogenating agent is added in an amount of 0.0025 mol to 0.01 mol, based on 1 mol of the metallic magnesium.

The method for preparing the magnesium alkoxide catalyst support of the present invention is carried out in an inert gas, and the inert gas used includes argon gas and nitrogen gas, preferably nitrogen gas.

In the method for preparing the magnesium alkoxide catalyst support of the invention, the raw materials (the metallic magnesium, monohydric alcohol and halogenating agent) can be added at one time or in multiple times; the addition in multiple times can prevent instantaneous generation of a large amount of hydrogen gas and thus prevent spattering of alcohol or halogen caused by the instantaneous generation of a large amount of hydrogen gas.

The inert organic solvent, which is used to disperse the material in the invention, can dilute the material so that the resultant liquid is reacted while being well stirred, which can facilitate the emission of the reaction heat, avoid fierce reaction, and also eliminate some electrostatic charges, so that the products may keep good particle morphology.

The present invention also provides a magnesium alkoxide catalyst support, which is prepared by the above-described method for preparing a magnesium alkoxide catalyst support.

The above magnesium alkoxide catalyst support of the present invention is used to catalyze olefin polymerization.

The magnesium alkoxide catalyst support prepared by the method for preparing the magnesium alkoxide catalyst support of the present invention has a controllable size. The magnesium alkoxide catalyst supports having various sizes can be obtained by adjusting the kinds of surfactants, so that the magnesium alkoxide catalyst supports having various sizes can be applied to various polymerization processes. When the average particle size (D50) of the surfactant is about 20 µm, it can be applied to a gas-phase polymerization process, and when the average particle size (D50) is about 50 µm, it can be applied in a bulk polymerization process.

The magnesium alkoxide catalyst support prepared by the above method for preparing the magnesium alkoxide catalyst support of the invention has simultaneously the following advantages: uniform particle shape, simple operation and controllable size.

DETAILED DESCRIPTION

The technical solutions of the present invention are described in detail as below for more distinct comprehension for the technical features, objects, and advantages of the present invention, which are not intended to limit the scope of the invention.

Particle Size Distribution:

The particle size of the magnesium alkoxide was determined using a Malvern MastersizerTMX;

Average particle size (D50): a particle size corresponding to 50% cumulative weight;

The particle size of the magnesium alkoxide and its distribution index Span=(D90−D10)/D50 are used to characterize the uniformity of the particle size distribution.

Example 1

This Example provides a magnesium alkoxide catalyst support which is prepared by the following procedures.

A reflux condenser, a thermometer and a burette were installed onto a reactor equipped with a stirrer. The top of the reflux condenser was connected with a conduit which was connected, on the other end, to an oil-sealing device to facilitate the observation of $H_2$. After sufficient substitution with nitrogen, 2 g of magnesium powder, 10 mL of decane, 30 mL of absolute ethanol, 0.2 g of iodine and 1.5 mL of n-butyl titanate were added to the reactor. The resultant was warmed after the reaction is activated for 15 minutes, until the reaction temperature for the reaction system was reached. The step of adding magnesium powder, alcohol, iodine and decane in the same amount as the previous feed after $H_2$ was no longer discharged from reaction system was repeated, such that the addition was carried out for 5 times in total. After the final batch was added and $H_2$ was no longer produced by the reaction, the reaction system was aged for 2 hours. Upon the completion of the final reaction, the product was washed, separated and dried to obtain a white solid powder with good fluidity.

The particle size and distribution of the product were measured using a particle size distribution meter. The results are shown in Table 1.

Example 2

This Example provides a magnesium alkoxide catalyst support which is prepared by the following procedures.

The same procedures as those in Example 1 were carried out, except that 1.5 mL of tributyl phosphate was added to the reaction system, and the reaction was carried out at 78° C. for 4 hours. Upon the completion of the final reaction, the product was washed, separated and dried to obtain a white solid powder with good fluidity.

The obtained product was characterized in the same manner as that in Example 1. The results are shown in Table 1.

Example 3

This Example provides a magnesium alkoxide catalyst support which is prepared by the following procedures.

The same procedures as those in Example 1 were carried out, except that 1.5 mL of di-n-butyl phthalate was added to the reaction system, and the reaction was carried out at 78° C. for 4 hours. Upon the completion of the final reaction, the product was washed, separated and dried to obtain a white solid powder with good fluidity.

The obtained product was characterized in the same manner as that in Example 1. The results are shown in Table 1.

Example 4

This Example provides a magnesium alkoxide catalyst support which is prepared by the following procedures.

The same procedures as those in Example 1 were carried out, except that 1.5 mL of ethylene glycol diacetate was added to the reaction system, and the reaction was carried out at 78° C. for 4 hours. Upon the completion of the final reaction, the product was washed, separated and dried to obtain a white solid powder with good fluidity.

The obtained product was characterized in the same manner as that in Example 1. The results are shown in Table 1.

Example 5

This Example provides a magnesium alkoxide catalyst support which is prepared by the following procedures.

The same procedures as those in Example 1 were carried out, except that 1.5 mL of triacetin was added to the reaction system, and the reaction was carried out at 78° C. for 4 hours. Upon the completion of the final reaction, the product was washed, separated and dried to obtain a white solid powder with good fluidity.

The obtained product was characterized in the same manner as that in Example 1. The results are shown in Table 1.

Example 6

This Example provides a magnesium alkoxide catalyst support which is prepared by the following procedures.

The same procedures as those in Example 1 were carried out, except that 0.5 mL of triacetin was added to the reaction system, and the reaction was carried out at 78° C. for 4 hours. Upon the completion of the final reaction, the product was washed, separated and dried to obtain a white solid powder with good fluidity.

The obtained product was characterized in the same manner as that in Example 1. The results are shown in Table 1.

Example 7

This Example provides a magnesium alkoxide catalyst support which is prepared by the following procedures.

The same procedures as those in Example 1 were carried out, except that 1.5 mL of catechol di-p-tosylate was added to the reaction system, and the reaction was carried out at 78° C. for 4 hours. Upon the completion of the final reaction, the product was washed, separated and dried to obtain a white solid powder with good fluidity.

The obtained product was characterized in the same manner as that in Example 1. The results are shown in Table 1.

Example 8

This Example provides a magnesium alkoxide catalyst support which is prepared by the following procedures.

The same procedures as those in Example 1 were carried out, except that 1.5 mL of triethyl phosphite was added to the reaction system, and the reaction was carried out at 78° C. for 4 hours. Upon the completion of the final reaction, the product was washed, separated and dried to obtain a white solid powder with good fluidity.

The obtained product was characterized in the same manner as that in Example 1. The results are shown in Table 1.

Example 9

This Example provides a magnesium alkoxide catalyst support which is prepared by the following procedures.

The same procedures as those in Example 1 were carried out, except that 0.5 mL of n-butyl titanate and 0.5 mL of di-n-butyl phthalate were added to the reaction system, and the reaction was carried out at 78° C. for 4 hours. Upon the completion of the final reaction, the product was washed, separated and dried to obtain a white solid powder with good fluidity.

The obtained product was characterized in the same manner as that in Example 1. The results are shown in Table 1.

Comparative Example 1

The same procedures as those in Example 1 were carried out, except that no surfactant was added to the reaction system, and the reaction was carried out at 78° C. for 4 hours. Upon the completion of the final reaction, the product was washed, separated and dried to obtain a white solid powder with good fluidity.

The obtained product was characterized in the same manner as that in Example 1. The results are shown in Table 1.

TABLE 1

| | Particle shape | Average particle size D50 (μm) | Particle size distribution index |
|---|---|---|---|
| Example 1 | spherical | 22.2 | 1.3 |
| Example 2 | spherical | 43.7 | 1.2 |
| Example 3 | spherical | 54.7 | 1.1 |
| Example 4 | spherical | 39.3 | 1.1 |
| Example 5 | spherical | 23.5 | 1.2 |
| Example 6 | spherical | 16.5 | 1.3 |
| Example 7 | spherical | 51.4 | 0.9 |
| Example 8 | spherical | 42.5 | 1.3 |
| Example 9 | spherical | 35.8 | 1.2 |
| Comparative Example 1 | spherical | 51.3 | 1.3 |

As can be seen from Table 1, when no surfactant was added in Comparative Example 1, only a support of about 50 μm was obtained with a limited size controlling range. In contrast, according to the preparation method in Example 1 magnesium alkoxide catalyst supports having various sizes were obtained by adjusting types of the surfactant.

The above Examples show that the method for preparing a magnesium alkoxide catalyst support of the present invention can produce magnesium alkoxide particles having excellent particle morphology and uniform particle size distribution. Supports having various sizes can be obtained by changing types of surfactants, which support can be selectively used for various olefin polymerization processes. The inventive method has advantages which are apparent as compared with other methods. The magnesium alkoxide catalyst support prepared in the present invention is excellent as a support for catalyzing olefin polymerization.

What is claimed is:

1. A method for preparing a magnesium alkoxide catalyst support, comprising the following steps:
    mixing a metallic magnesium, a monohydric alcohol, a halogenating agent and a surfactant at 0° C. to 90° C. under an inert gas atmosphere, and then washing the resultant with an inert solvent to obtain the magnesium alkoxide catalyst support;
    wherein the monohydric alcohol is added in an amount of 2 mol to 50 mol, the halogenating agent is added in an amount of 0.0025 mol to 0.03 mol, and the inert organic solvent is added in an amount of 2 mol to 50 mol, based on 1 mol of the metallic magnesium;
    wherein the surfactant is added in a volume of from 0.01% to 10% based on the volume of the monohydric alcohol, and the surfactant is one or more selected from n-butyl titanate, tributyl phosphate, triphenyl phosphate, triethyl phosphite, 1,2-butanediol ditosylate, catechol di-p-tosylate, diethyl phthalate, di-n-butyl phthalate, diisobutyl phthalate, ethylene glycol diacetate and triacetin.

2. The method for preparing a magnesium alkoxide catalyst support according to claim 1, wherein the metallic magnesium, the monohydric alcohol and the halogenating agent are added at one time or in batches.

3. The method for preparing a magnesium alkoxide catalyst support according to claim 2, wherein the metallic magnesium, the monohydric alcohol and the halogenating agent are added in batches.

4. The method for preparing a magnesium alkoxide catalyst support according to claim 1, wherein the metallic magnesium has a particle size of 0.5 μm to 300 μm.

5. The method for preparing a magnesium alkoxide catalyst support according to claim 1, wherein the monohydric alcohol is selected from the group consisting of methanol, ethanol, n-propanol, isopropanol, n-butanol, isobutanol, n-pentanol, isopentanol, n-hexanol, isohexanol, n-heptanol, isoheptanol, n-octanol, isooctanol, n-nonanol, isononanol, n-decanol, isodecanol, phenol, phenyl methanol, phenyl ethanol, phenyl propanol, and any combinations thereof.

6. The method for preparing a magnesium alkoxide catalyst support according to claim 5, wherein the monohydric alcohol includes one or more selected from methanol, ethanol, propanol and butanol.

7. The method for preparing a magnesium alkoxide catalyst support according to claim 1, wherein the halogenating agent includes one or more selected from iodine, bromine, chlorine, magnesium iodide, magnesium bromide, magnesium chloride, calcium iodide, calcium bromide, calcium chloride, mercuric iodide, mercuric bromide, mercuric chloride, carbon tetraiodide, carbon tetrabromide, carbon tetrachloride and alkoxy magnesium halide.

8. The method for preparing a magnesium alkoxide catalyst support according to claim 7, wherein the halogenating agent includes one or more selected from iodine, carbon tetrachloride, magnesium iodide, magnesium chloride and alkoxy magnesium halide.

9. The method for preparing a magnesium alkoxide catalyst support according to claim 1, wherein the inert organic solvent includes one or more selected from hexane, heptane, octane, decane, benzene, toluene, xylene, chlorobenzene, a toluene derivative, a xylene derivative and a chlorobenzene derivative.

10. The method for preparing a magnesium alkoxide catalyst support according to claim 1, wherein the monohydric alcohol is added in an amount of 5 mol to 20 mol, and the halogenating agent is added in an amount of 0.0025 mol to 0.01 mol, based on 1 mol of the metallic magnesium.

\* \* \* \* \*